US012602181B2

(12) United States Patent
Du et al.

(10) Patent No.: US 12,602,181 B2
(45) Date of Patent: Apr. 14, 2026

(54) MEMORY TRAINING FOR POWER STATE CHANGES

(71) Applicant: Advanced Micro Devices, Inc., Santa Clara, CA (US)

(72) Inventors: Xianglong Du, Shanghai (CN); Kai-Chieh Chan, Shanghai (CN); Haibin Niu, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/380,761

(22) Filed: Oct. 17, 2023

(65) Prior Publication Data

US 2025/0123761 A1 Apr. 17, 2025

(51) Int. Cl.
*G06F 3/06* (2006.01)

(52) U.S. Cl.
CPC .......... *G06F 3/0634* (2013.01); *G06F 3/0611* (2013.01); *G06F 3/0658* (2013.01); *G06F 3/0673* (2013.01)

(58) Field of Classification Search
None
See application file for complete search history.

(56) References Cited

U.S. PATENT DOCUMENTS

2017/0351450 A1    12/2017  Brandl et al.
2022/0155956 A1*    5/2022  Rayaprolu .......... G11C 11/5642

FOREIGN PATENT DOCUMENTS

CN            103576833 A  *  2/2014  .......... G06F 1/3275

* cited by examiner

*Primary Examiner* — Brian R Peugh
(74) *Attorney, Agent, or Firm* — Polansky & Associates, P.L.L.C.; Paul J. Polansky

(57) ABSTRACT

A data processor includes a memory controller and a physical interface circuit coupled to the memory controller. In response to a system startup, the memory controller controls the physical interface circuit to selectively train a memory based on whether a first memory clock frequency of a plurality of power states equals any other memory clock frequency of the plurality of power states.

20 Claims, 6 Drawing Sheets

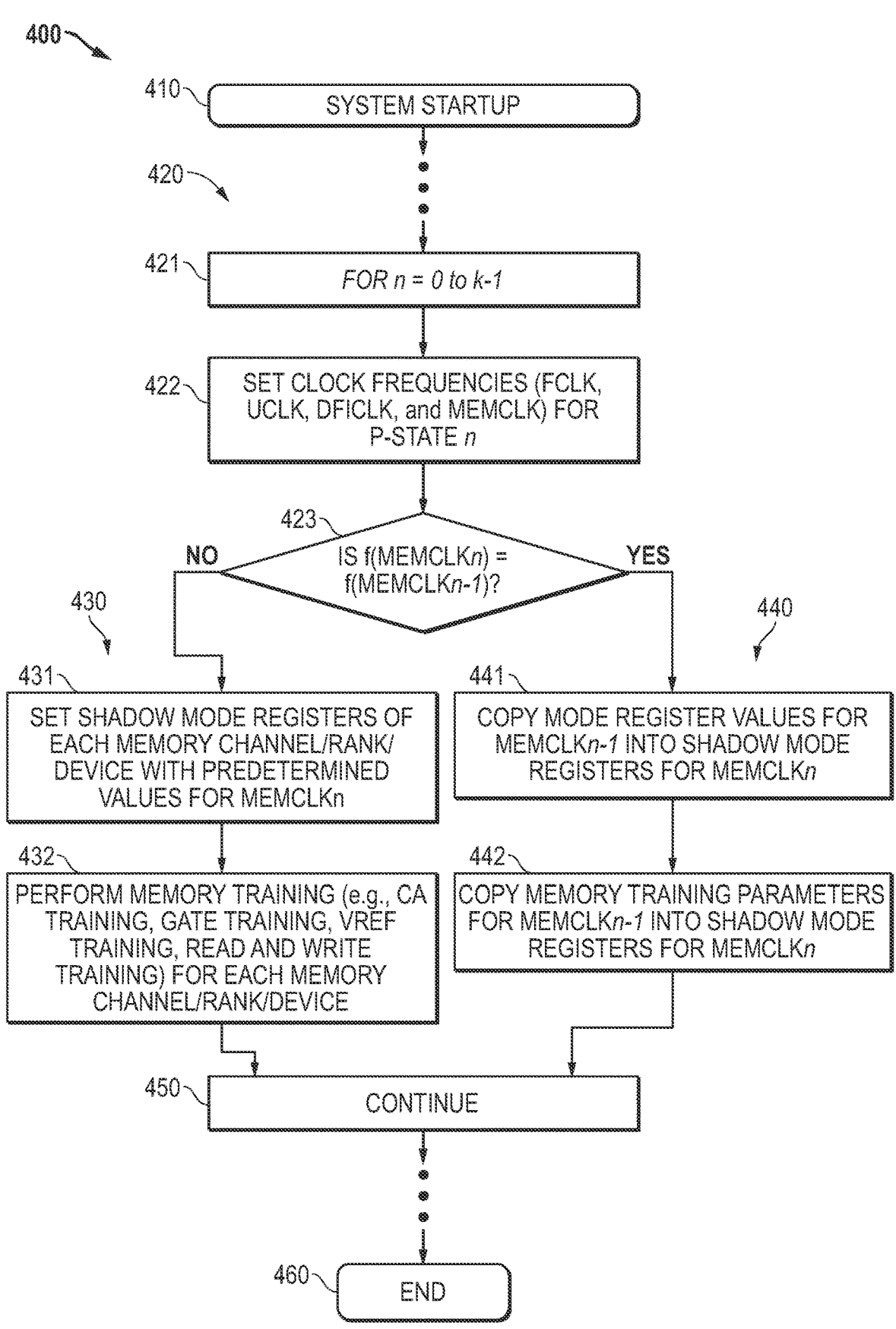

400

410 — SYSTEM STARTUP

420

421 — *FOR n = 0 to k-1*

422 — SET CLOCK FREQUENCIES (FCLK, UCLK, DFICLK, and MEMCLK) FOR P-STATE *n*

423 — IS f(MEMCLK*n*) = f(MEMCLK*n-1*)?

NO          YES 430          440

431 — SET SHADOW MODE REGISTERS OF EACH MEMORY CHANNEL/RANK/ DEVICE WITH PREDETERMINED VALUES FOR MEMCLK*n*

441 — COPY MODE REGISTER VALUES FOR MEMCLK*n-1* INTO SHADOW MODE REGISTERS FOR MEMCLK*n*

432 — PERFORM MEMORY TRAINING (e.g., CA TRAINING, GATE TRAINING, VREF TRAINING, READ AND WRITE TRAINING) FOR EACH MEMORY CHANNEL/RANK/DEVICE

442 — COPY MEMORY TRAINING PARAMETERS FOR MEMCLK*n-1* INTO SHADOW MODE REGISTERS FOR MEMCLK*n*

450 — CONTINUE

460 — END

*FIG. 4*

| P-State | FCLK | UCLK | MEMCLK |
|---------|------|------|--------|
| P0 | 1600 | 1800 | 1800 |
| P1 | 1000 | 1800 | 1800 |
| P2 | 500 | 500 | 1000 |

MEMORY TRAINING FOR POWER STATE CHANGES

BACKGROUND

Computer systems typically use inexpensive and high density dynamic random access memory (DRAM) chips for main memory. A memory controller and its associated DRAM memory are typically put into different operating power states to increase performance or to reduce power consumption. Each operating power state is defined by a speed and a power supply voltage for each component in the computer system, such as data processor cores, data fabric, memory controller, and memory. Modern DRAMs, such as double data rate, version five (DDR5) DRAMs have a large set of operating parameters that must be trained at startup for each particular operating speed. Later during operation, the memory parameters for a new selected power state are written to the DRAM before operation begins in that power state. The large number of these operating parameters and power states cause the startup training sequence to be so long that system startup will be significantly slowed, causing poor user experience.

BRIEF DESCRIPTION OF THE DRAWINGS

FIG. 4 is a flow diagram of a startup flow of a memory system during training of multiple operating clock frequencies according to some implementations;

FIG. 5 is a chart of exemplary power states that can be used by the data processing systems of FIGS. 1 and 2.

Figure 1:
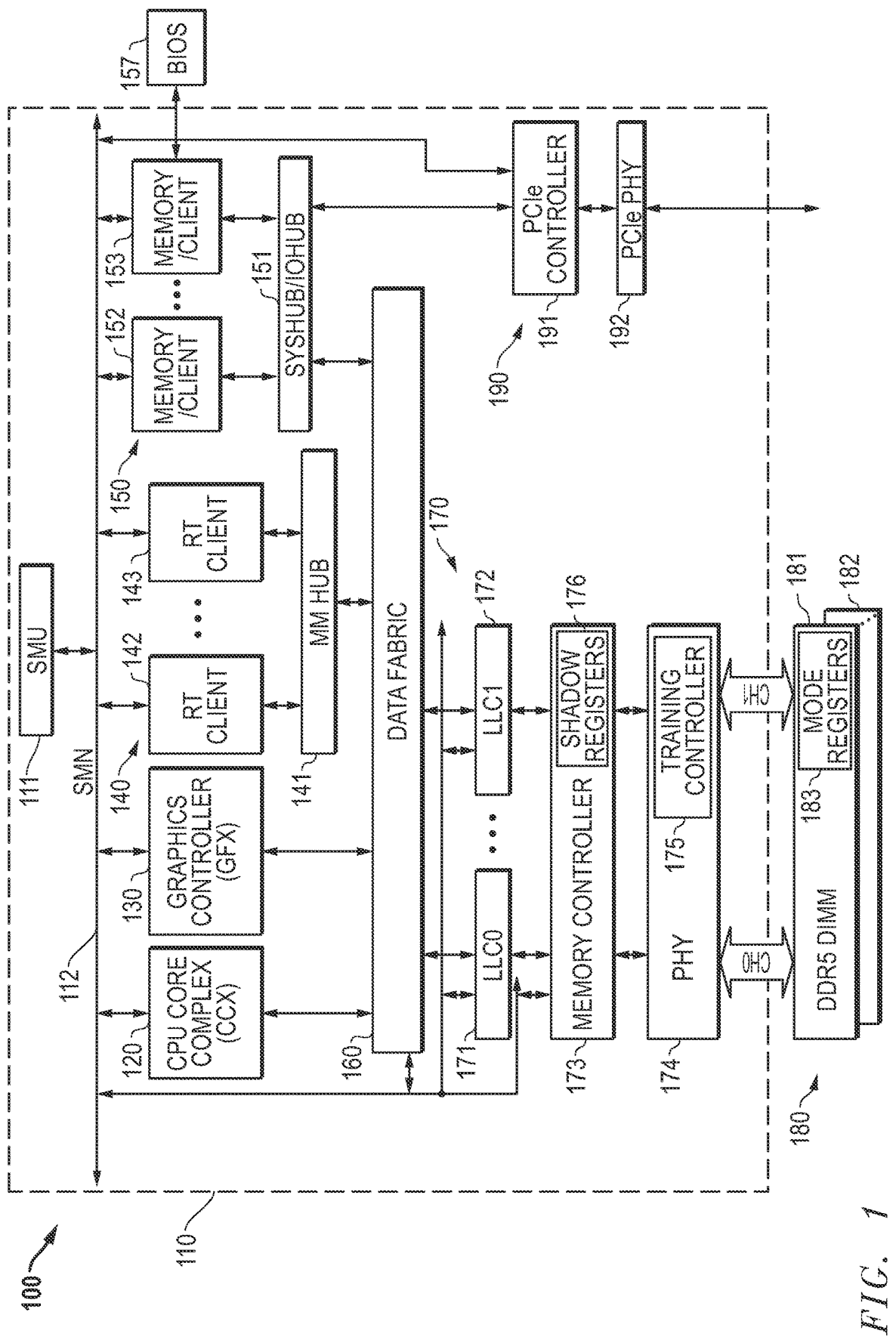
FIG. 1 illustrates in block diagram form a data processing system according to some implementations.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

According to various implementations disclosed herein, a data processor, data processing system, and a method reduce long startup times caused by slow memory training sequences. The memory training at startup is only performed for power states that use a memory clock frequency that is different than the memory clock frequency of a previously trained power state. If the clock frequencies are the same, the trained parameters of the previously trained power state are copied into the storage area for the present power state.

Startup time is reduced because the copy operation is significantly shorter than the memory training sequence. The result is that the startup time of the computer or data processor-based device is greatly reduced, enhancing user experience. In complex data processing systems, having multiple memory channels, multiple ranks, and multiple memory clocks for each rank, and multiple power states, the reduction in system startup time can be on the order of one minute or more.

A data processor includes a memory controller and a physical interface circuit coupled to the memory controller. In response to a system startup, the memory controller controls the physical interface circuit to selectively train a memory based on whether a first memory clock frequency of a plurality of power states equals any other memory clock frequency of the plurality of power states.

A data processing system including a data processor and a memory having a plurality of mode registers for storing a configuration state. In response to a system startup, the data processor selectively trains the memory based on whether a first memory clock frequency of a plurality of power states equals any other memory clock frequency of the plurality of power states.

A method for use in a data processing system includes, for each of a plurality of power states including a memory clock frequency if the memory clock frequency of the given power state is different from the memory clock frequency of each prior power state, a memory is trained at the memory clock frequency of the given power state and training values are stored in shadow registers. If the memory clock frequency of the given power state is the same as the memory clock frequency of any prior power state, values of the prior power state having the same memory clock frequency in the shadow registers are copied for the given power state.

FIG. 1 illustrates in block diagram form a data processing system 100 according to some implementations. Data processing system 100 includes a data processor 110 in the form of a system-on-chip (SOC), a basic input/output system (BIOS) memory 157 labelled "BIOS", and a memory 180 in the form of an external Double Data Rate, version 5, synchronous dynamic random-access memory (DDR5 SDRAM) system. Many other components of an actual data processing system are typically present but are not relevant to understanding the present disclosure and are not shown in FIG. 1 for ease of illustration.

Data processor 110 includes generally a system management unit (SMU) 111, a system management network (SMN) 112, a data processor core 120 in the form of a central processing unit (CPU) core complex labelled "CCX", a graphics controller 130 labelled "GFX", a real-time client subsystem 140, a memory/client subsystem 150, a data fabric 160, a memory access circuit 170 for memory 180, and a Peripheral Component Interface Express (PCIe) subsystem 190. As will be appreciated by a person of ordinary skill, data processor 110 may not have all of these elements present in every implementation and, further, may have additional elements included therein.

SMU 111 is bidirectionally connected to the major components in data processor 110 over SMN 112. SMN 112 forms a control fabric for data processor 110. SMU 111 is a local controller that controls the operation of the resources on data processor 110 and synchronizes communication among them. SMU 111 manages power-up sequencing of the various processors on data processor 110 and controls multiple off-chip devices via reset, enable, and other signals. SMU 111 includes one or more clock sources (not shown), such as a phase locked loop (PLL), to provide clock signals for each of the components of data processor 110. SMU 111 also manages power for the various processors and other functional blocks, and may receive measured power consumption values from CPU cores in data processor core 120 and graphics controller 130 to determine appropriate P-states.

Data processor core 120 is a CPU core complex that includes a set of CPU cores, each of which is bidirectionally connected to SMU 111 over SMN 112. Each CPU core may be a unitary core only sharing a last-level cache with the other CPU cores, or may be combined with some but not all of the other cores in clusters.

Graphics controller 130 is bidirectionally connected to SMU 111 over SMN 112. Graphics controller 130 is a high-performance graphics processing unit capable of performing graphics operations such as vertex processing, fragment processing, shading, texture blending, and the like in a highly integrated and parallel fashion. In order to perform its operations, graphics controller 130 requires periodic access to external memory. In the implementation shown in FIG. 1, graphics controller 130 shares a common memory subsystem with CPU cores in data processor core 120, an architecture known as a unified memory architecture. Because data processor 110 includes both a CPU and a GPU, it is also referred to as an accelerated processing unit (APU).

Real-time client subsystem 140 includes a set of real-time clients such as representative real time clients 142 and 143, and a memory management hub 141 labelled "MM HUB". Each real-time client is bidirectionally connected to SMU 111 over SMN 112, and to memory management hub 141. Real-time client subsystem 140 could include any type of peripheral controller that requires periodic movement of data, such as an image signal processor (ISP), an audio coder-decoder (codec), a display controller that renders and rasterizes objects generated by graphics controller 130 for display on a monitor, and the like.

Memory/client subsystem 150 includes a set of memory elements or peripheral controllers such as memory/client devices 152 and 153, and a system and input/output hub 151 labeled "SYSHUB/IOHUB". Each memory/client device is bidirectionally connected to SMU 111 over SMN 112, and to system and input/output hub 151. Memory/client devices 152 and 153 are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like. In data processor 110, memory/client device 153 is adapted to connect to an external memory storing a basic input/output system (BIOS), that is, BIOS memory 157.

Data fabric 160 is an interconnect that controls the flow of traffic in data processor 110. Data fabric 160 is bidirectionally connected to SMU 111 over SMN 112, and is bidirectionally connected to data processor core 120, graphics controller 130, memory management hub 141, system and input/output hub 151. Data fabric 160 includes a crossbar switch for routing memory-mapped access requests and responses between any of the various devices of data processor 110. It includes a system memory map, defined by a basic input/output system (BIOS), for determining destinations of memory accesses based on the system configuration, as well as buffers for each virtual connection.

Memory access circuit 170 is a circuit that controls the transfer of data to and from memory 180. Memory access circuit 170 includes a last-level cache 171 for a first channel labelled "LLC0", a last-level cache 172 for a second channel labelled "LLC1", a memory controller 173, and a physical interface circuit 174 labelled "PHY" connected to memory 180. Last-level cache 171 is bidirectionally connected to SMU 111 over SMN 112 and has an upstream port bidirectionally connected to a downstream port of data fabric 160, and a downstream port. Last-level cache 172 is bidirectionally connected to SMU 111 over SMN 112 and has an upstream port bidirectionally connected to a downstream port of data fabric 160, and a downstream port. Memory controller 173 has a first upstream port bidirectionally connected to the downstream port of last-level cache 171, a second upstream port bidirectionally connected to the downstream port of last-level cache 172, and first and second downstream ports. As shown in FIG. 1, memory controller 173 includes a set of shadow registers 176. Shadow registers 176 include registers corresponding to mode registers of memory devices in memory 180, and include values that will be programmed into the mode registers when data processor 110 places memory 180 into the corresponding memory P-state. Shadow registers 176 include sets of registers for each channel, rank, and device of memory 180, since the various trained values vary according to the varying electrical parameters of the interface between the PHY and the memory device. The operation of shadow registers 176 will be described further below. Physical interface circuit 174 has a first upstream port bidirectionally connected to the first downstream port of memory controller 173, a second upstream port bidirectionally connected to the second downstream port of memory controller 173, and first and second downstream ports bidirectionally connected to memory 180 and corresponding to a first channel labelled "CH0" and a second channel labelled "CH1", respectively. As shown in FIG. 1, physical interface circuit 174 includes a training controller 175 whose operation will be described below.

In the illustrated implementation, memory 180 includes a set of DDR5 dual-inline memory modules (DIMMs) including representative DIMMs 181 and 182 implemented using two physical channels. Each DIMM includes a set of DDR5 memory chips operating according to the DDR5 standard. In some implementations, DIMMs 181 and 182 are unbuffered DIMMs that support channels CH0 and CH1, as well as multiple ranks on each channel each with multiple memory chips per rank. In one example, each rank can have ten by-eight (×8) memory chips in which four memory chips store data forming a data width of ×32, and one memory chip stores eight error correcting code (ECC) bits for the data, for each of two sub-channels. In other implementations, DIMMs 181 and 182 can be load reduction DIMMs (LRDIMMs) that include a register clock driver and a set of data buffers that buffer and redistribute signals between physical interface circuit 174 and individual memory chips in each of DIMMs 181 and 182. In still other implementations, DIMMs 181 and 182 can be registered DIMMs (RDIMMs), in which each RDIMM has a register that serves as a buffer between the pins of the command and address buses on the DIMM and the memory chips, and allow scalability of the memory space for computers such as servers, workstations, and high-end desktops.

The bidirectional connection between physical interface circuit 174 and memory 180 includes signal groups as defined by the DDR5 standard, including separate bidirectional data signals and command and address input signals output by physical interface circuit 174 and input by the selected DIMM for each channel.

In operation, data processor 110 integrates a complex assortment of computing and storage devices, including data processor core 120 and graphics controller 130, on a single chip. Most of these controllers are well known and will not be discussed further. Data processor 110 includes multiple internal buses for conducting data between these circuits at high speed. For example, data processor core 120 accesses data over a high-speed, 32-bit bus through an upstream port of data fabric 160. Data fabric 160 multiplexes accesses between any of a number of memory accessing agents connected to its upstream ports, and memory accessing responders connected to its downstream ports. Because of the large number of memory accessing agents and memory accessing responders, the number of internal bus lines is quite large as well and a crossbar switch in data fabric 160 multiplexes these wide buses to form virtual connections between the memory access requesters and the memory accessing responders.

The various processing nodes also maintain their own cache hierarchies. In a typical configuration, data processor core 120 includes four data processor cores each having its own dedicated level-one (L1) and level two (L2) caches, and having a level three (L3) cache shared between the four CPU cores in the cluster. In this example, last-level caches 171 and 172 would form level four (L4) caches, but regardless of the internal organization of the cache hierarchies in data processor core 120, they operate as the last-level caches in the cache hierarchy. In one example, last-level caches 171 and 172 implement inclusive caches, in which any cache line stored in any higher-level cache in data processor 110 will also be stored in them. In another example, last-level caches 171 and 172 are victim cache, and include cache lines each of which contained data that was requested by a data processor at an earlier point in time, but ultimately became the least recently used cache line and was evicted from all upper-level caches.

According to various implementations to be described here and in further detail below, data processor 110 stores parameters from BIOS memory 157 in a controller of memory controller 173 to allow it to perform power state change requests for memory 180 efficiently. On power-up, a designated CPU core in data processor core 120 loads instructions from BIOS memory 157 to start up the system. Among these instructions are instructions that allow training controller 175 to determine various timing and power parameters in the system, including any one of a number of operating power states that trade off the needs for high performance and low power. They also include instructions that allow memory controller 173 to efficiently startup as will be described in more detail below. The result is that data processing system 100 supports multiple chip power states while starting up faster that known data processing systems of comparable complexity and power state support.

Figure 2:
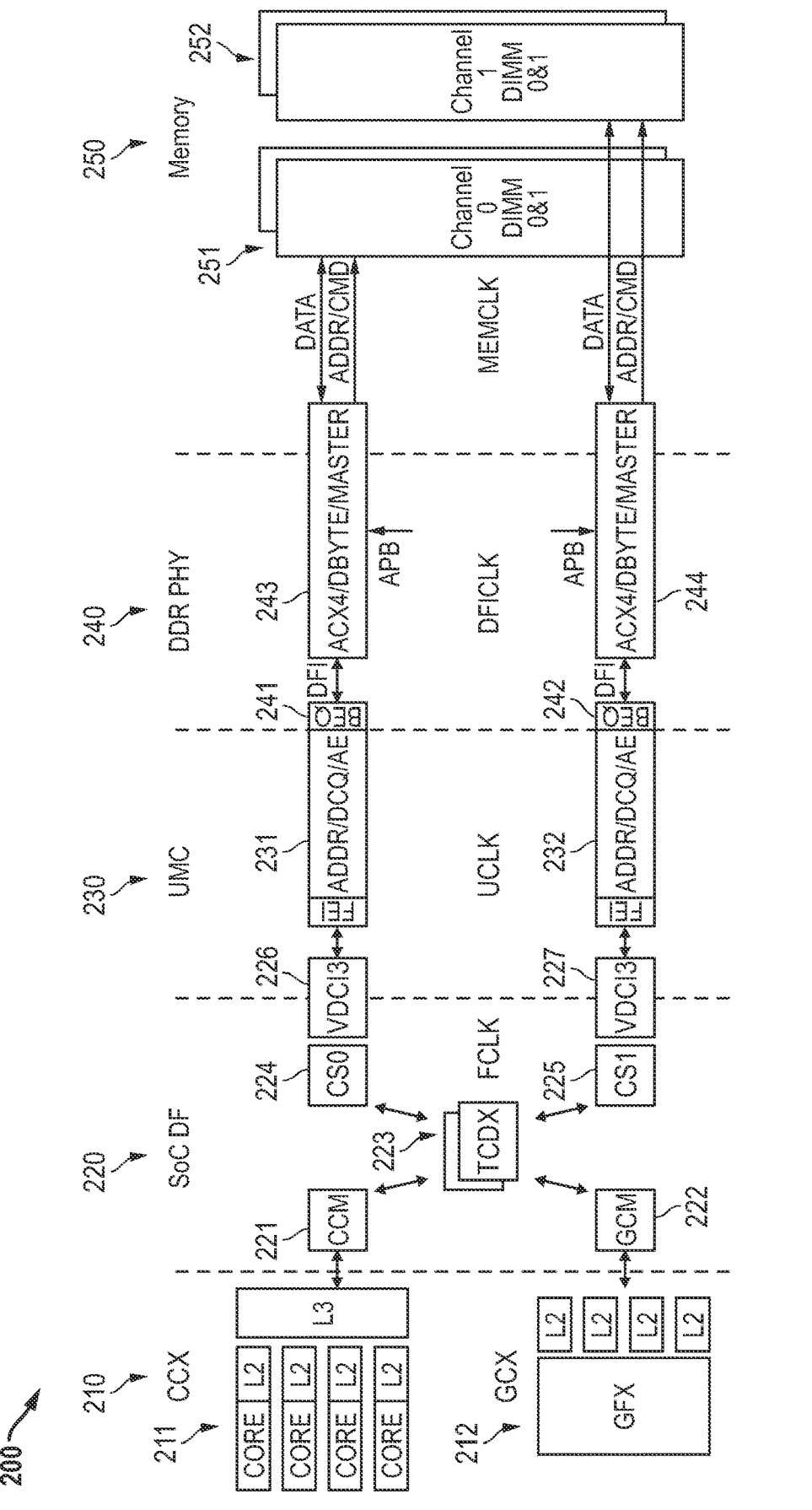
FIG. 2 illustrates in block diagram form a clock domain architecture of a data processing system that can be used to implement the data processing system of FIG. 1.

FIG. 2 illustrates in block diagram form a clock domain architecture of a data processing system 200 that can be used to implement data processing system 100 of FIG. 1. Data processing system 200 includes a processor core clock domain 210, a data fabric clock domain 220 labelled "SoC DF", a memory controller clock domain 230 labelled "UMC", a DDR-physical interface clock domain 240 labelled "DDR PHY", and a memory clock domain 250.

Processor core clock domain 210 includes a central processing unit core complex 211 labelled "CCX" and a graphics core complex 212 labelled "GCX". In the example of FIG. 2, central processing unit core complex 211 includes four central processing unit (CPU) cores each having level-one (L1) and level-two (L2) caches and a shared level three (L3) cache. Graphics core complex 212 includes a single multi-threaded graphics core labelled "GFX" having separate L1 and L2 caches for each thread. In an alternate implementation, the single multi-threaded graphics processing unit core could be replaced with four separate GPU cores. Many modern multi-core processors tune performance and power consumption by operating each processor core using dynamic voltage and frequency scaling (DVFS) at a respective power state defined by a particular clock speed and power supply voltage required to operate at a clock speed that is selected according to changing workloads.

Data fabric clock domain 220 includes coherent master ports, crossbar switches, and coherent slave ports. The coherent master ports include a CPU coherent master port 221 labelled "CCM" and a GPU coherent master port 222 labelled "GCM". CPU coherent master port 221 has a bidirectional upstream port connected to the L3 cache of central processing unit core complex 211, and a downstream port. As used herein, "upstream" means on a side toward a data processor core and away from memory, and "downstream" means on a side toward memory and away from a data processor core. GPU coherent master port 222 has a bidirectional upstream port connected to the L2 caches of graphics core complex 212, and a downstream port. Crossbar switches 223 include a representative set of two crossbar switches each labelled "TCDX". The coherent slave ports include a coherent slave port 224 labelled "CS0", and a coherent slave port 225 labelled "CS1". Coherent slave port 224 has an upstream port connected to one of downstream ports of crossbar switches 223, and a downstream port. Coherent slave port CPU 225 has an upstream port connected to another one of the downstream ports of crossbar switches 223, and a downstream port. Data fabric clock domain 220 operates according to a clock signal labelled "FCLK". In some implementations, data fabric clock domain 220 operates on the same voltage supply as processor core clock domain 210.

Memory controller clock domain 230 includes a memory controller 231 and a memory controller 232, each labelled "ADDR/DCQ/AE". Memory controller 231 has an upstream port formed by a front-end interface labelled "FEI" to coherent slave 224 through a voltage level converter 226 labelled "VDCI3". Memory controller 232 has a downstream port formed by a front-end interface FEI to coherent slave 225 through a voltage level converter 227 also labelled "VDCI3". Memory controller domain 220 operates according to a clock signal labelled "UCLK", and a potentially different power voltage supply, creating the need for voltage level converters 226 and 227.

DDR-physical interface clock domain 240 includes a back-end queue 241 of memory controller 231 labelled "BEQ", a back-end queue 242 of memory controller 232 also labelled "BEQ", a physical interface circuit 243, and a physical interface circuit 244. Physical interface circuit 243 has an upstream port connected to back-end queue 241 over an interface known as the DDR-Phy interface labelled "DFI", a downstream port, and a control input labelled "APB". Physical interface circuit 244 has an upstream port connected to back-end queue 242 over a DDR-Phy interface also labelled "DFI", a downstream port, and a control input also labelled "APB". DDR-physical interface clock domain 240 operates according to a clock signal labelled "DFICLK" and with the UMC power supply.

Memory clock domain 250 includes a representative pair of DIMMs 251 on Channel 0, and a representative pair of DIMMs 252 on Channel 1. Each of DIMMs 251 has a bidirectional port connected to the downstream port of physical interface circuit 243 for receiving address and command signals labelled "ADDR/CMD", and bidirectionally conducting data labelled "DATA". Each of DIMMs 252 has a bidirectional port connected to the downstream port of physical interface circuit 244 for receiving address and command signals also labelled "ADDR/CMD", and bidirectionally conducting data also labelled "DATA". Memory clock domain 250 operates according to a clock signal labelled "MEMCLK" having a frequency that is either the same as or is ratioed to that of the DFICLK, and is on the same power supply voltage as physical interface circuits 243 and 244.

It is desirable to operate data processing system 200 with a small number of different system power states that encompass various operating points to achieve a good tradeoff between low power and high performance as appropriate for varying workloads. In general, the memory channel must be trained for operation at each unique clock frequency. However, known SoC and memory controller designs fail to take into account interrelationships between the clock domains of data processing system 200 under various workloads that can prolong startup training and lead to slow startup and poor user experience. These considerations will now be explained.

Figure 3:
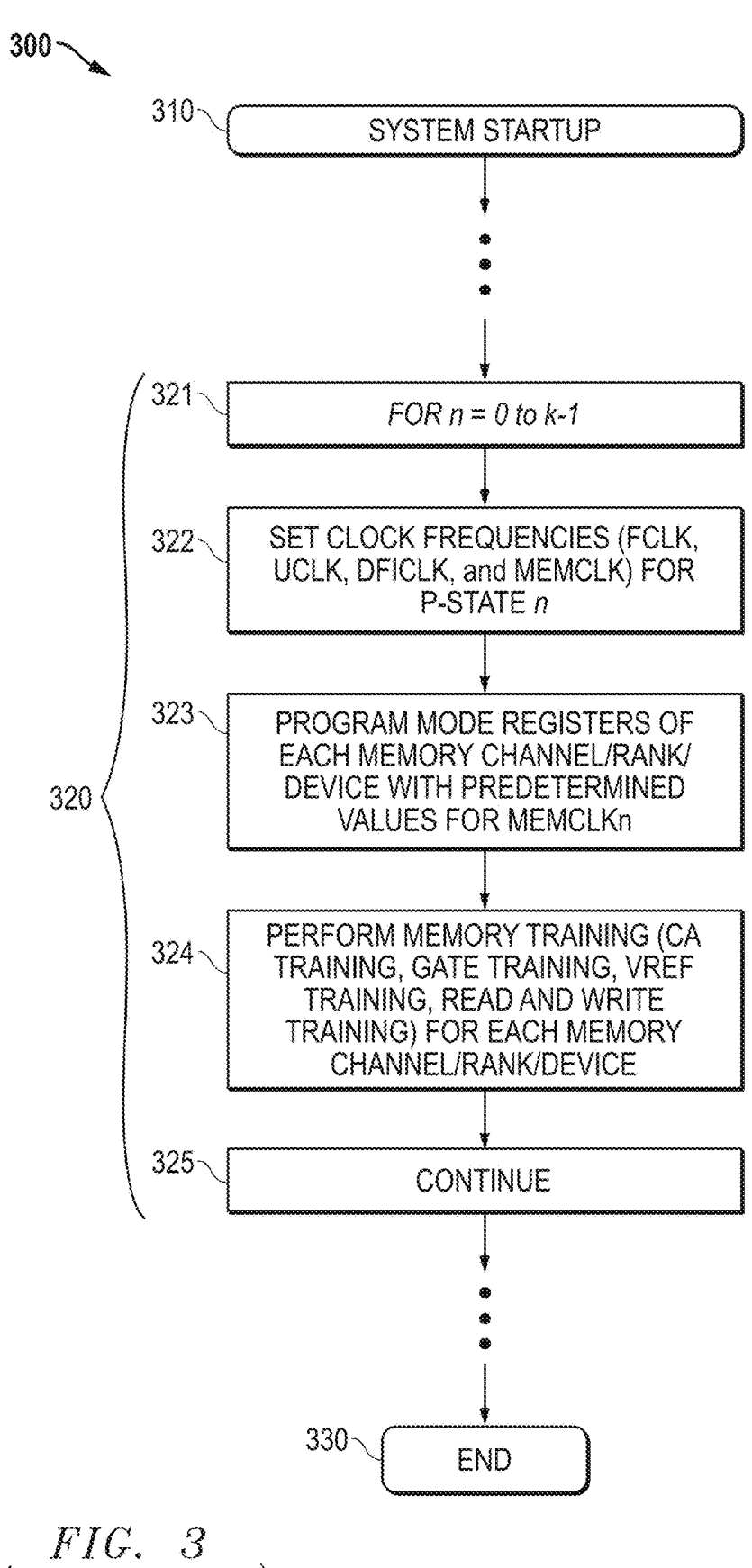
FIG. 3 is a flow diagram of a startup flow of a memory system during training at multiple operating clock frequencies according to the prior art.

FIG. 3 illustrates a flow diagram of a startup flow 300 of a memory system during training at multiple operating clock frequencies according to the prior art. Startup flow 300 begins at an action box 310 in which system startup is begun. Action box 310 may be invoked by a user turning on a power switch of a computing device in which data processing system 200 is part, by a periodic wake-up, or by a wakeup triggered by an electrical input. Actions taken in response to system startup are controlled by the BIOS in BIOS memory 157 and include several operations to prepare the computing device for normal operation. These will vary based on the environment and use of the computing device, but at system startup, the electronic circuitry is at the environmental ambient temperature, and so training values will be set at this relatively low temperature.

System startup is followed by a training routine 320. In general, training routine 320 determines the initial values of various operating parameters and trained (i.e., calibrated) values of other parameters that may vary according to the physical characteristics of the interface between the data processor and the memory and operating conditions such as power supply voltage, temperature, and the like. In order to determine k different power states, i.e., P-states, startup flow 300 uses an index n that in an action box 321 ranges from 0 to k−1. At an action box 322, startup flow 300 sets clock frequencies for P-STATE n. With reference to data processing system 200, for example, these clock frequencies include the FCLK, UCLK, DFICLK, and MEMCLK frequencies. In general, power state PO is the highest performance, highest power state, whereas power state Pk−1 is the lowest performance, lowest power state. Thus typically FCLK, UCLK, DFICLK and MEMCLK are set to their maximum specified values for power state PO, and to significantly lower values with each successive power state.

In an action box 323, startup flow 300 programs values for the mode registers of each channel, rank, and device for the current memory clock frequency. For example, a parameter known as CAS latency is generally set according to the characteristics of the memory chips in memory system 350. Various other parameters, turn-around times, and other delay times are set according to the clock speed and the manufacturer's specifications. These values are set before training occurs, and each mode register write cycle takes several MEMCLK cycles.

In an action box 324, training controller 175 in physical interface circuit 174 performs memory training. In general, the memory training can include command and address (CA) training, gate training, reverence voltage ("VREF") training, and read and write date eye training. These training sequences are well known and will not be described further. However, these steps must be repeated for each memory channel, memory rank, and memory device, and each training can take many clock cycles until the desired trained value is obtained. Once the trained values are obtained, they are stored in the memory controller and used for the starting values when the SoC operates the memory system in that power state.

In an action box 325, training using action boxes 321-324 continues for each successive value of n until all trained values for each memory channel, rank, and device has been obtained.

Data processing system 200 under control of the BIOS typically performs additional steps until all startup activities have been completed. At that point, control can be passed to the operating system.

In an action box 330, startup flow 300 ends.

It should be apparent that training routine 320 can take a significant amount of time. Moreover, the amount of time grows as the numbers of channels, ranks, devices, and power states increase such that in larger systems, startup becomes very long and user experience at startup becomes poor.

FIG. 4 is a flow diagram of a startup flow 400 of a memory system during training of multiple operating clock frequencies according to some implementations. Startup flow 400 begins at an action box 410 in which system startup is begun. Action box 410 may be invoked by a user turning on a power switch of a computing device in which data processing system 200 is part, by a periodic wake-up, or by a wakeup triggered by an electrical input. The system startup is controlled by the BIOS in BIOS memory 157 and includes several operations to prepare the computing device for normal operation. These will vary based on the environment and use of the computing device, but at system startup, the electronic circuitry is at the environmental ambient temperature, and so training values will be a function of this relatively low temperature.

System startup is followed by a training routine 420. In general, training routine 420 determines the initial values of various operating parameters and trained (i.e., calibrated) values of other parameters that may vary according to the physical characteristics of the interface between the data processor and the memory and operating conditions such as power supply voltage, temperature, and the like. In order to determine k different P-states, startup flow 300 400 sets an index n that ranges from 0 to k−1 in an action box 421 and an action box 450. At an action box 422, startup flow 400 sets clock frequencies (e.g., the FCLK, UCLK, DFICLK, and MEMCLK frequencies) for P-STATE n. In power state PO, FCLK, UCLK, DFICLK and MEMCLK are typically at or near their maximum specified values and at significantly lower values with each successive power state.

Startup flow 400 proceeds to a decision box 423, which determines whether the MEMCLK frequency for the current power state is the same as the MEMCLK frequency of any prior power state in the order in which the training proceeds. In the illustrated implementation, startup flow 400 assumes the P-states are trained in descending order of MEMCLK frequency, in which case decision box 423 determines whether f(MEMCLKn)=f(MEMCLKn−1). In other implementations, the training of the various power states can proceed in any arbitrary order.

If not, then flow proceeds to a subflow 430. Subflow 430 includes action boxes 431 and 432. In action box 431, predetermined values for the mode registers of each channel, rank, and device for the current memory clock frequency that don't vary based on the interface, such as CAS latency, various other parameters, turn-around times, and other delay times are set. These values are set before training occurs, and each mode register write cycle takes several MEMCLK cycles. In action box 432, the physical interface circuit performs memory training, such as command and address (CA) training, gate training, VREF training, and read and write date eye training. These steps are repeated for each memory channel, memory rank, and memory device, and each training can take many clock cycles until the desired trained value is obtained. Once the trained values are obtained, they are stored in shadow registers 176 of memory controller 173 and used for the starting values when the SoC changes the memory system to that power state.

If so, however, then flow proceeds to a subflow 440. Subflow 440 includes action boxes 441 and 442. In action box 441, predetermined values for the mode registers of each device, rank, and channel for the current memory clock frequency that don't vary based on the interface, such as CAS latency, various other parameters, turn-around times, and other delay times are copied from corresponding registers of the previous P-state. In action box 442, memory training values are copied from the MEMCLKn-1 shadow registers into the MEMCLKn registers.

In an action box 450, training using the above-mentioned actions is continued for each successive value of n until all trained values for each memory channel, rank, and device has been obtained for each of the k P-states.

Data processing system 200 under control of the BIOS typically performs additional steps until all startup activities have been completed. At that point, control can be passed to the operating system.

In an action box 460, startup flow 400 ends.

By performing subflow 440, data processing system 100 saves a significant amount of time by replacing repetitive parameter training that can take many cycles and require one or more mode register writes each cycle, with a single mode register write command. For example, DDR5 memory has a large number of mode registers with many different parameters related to decision feedback equalization performed on high-speed data pins. Training all the parameters can take approximately 90 seconds for each memory P-state. By copying the parameters for another P-state that uses the same memory clock frequency, the time is reduced to the amount of time required to copy the parameters trained for the other P-state into the shadow registers for the given P-state.

FIG. 5 is a chart 500 of exemplary power states that can be used by data processing system 100 of FIG. 1 and data processing system 200 of FIG. 2. Chart 500 includes three rows corresponding to a first power state 510 (the P0 state), a second power state 520 (the P1 state), and a third power state 530 (the P2 state), respectively, and three columns corresponding to the FCLK signal frequency, the UCLK signal frequency, and the MEMCLK signal frequency.

A first power state P0 is a highest-performance and highest-power state. The FLCK frequency is 1600 Megahertz (MHz), the UCLK signal is 1800 MHZ, and the MEMCLK signal is 1800 MHZ. A second power state P1 is a medium-performance and medium-power state. The FLCK frequency is 1000 Megahertz (MHz), the UCLK signal is 1800 MHZ, and the MEMCLK signal is 1800 MHZ. A third power state P2 is a lowest-performance and lowest-power state. The FLCK frequency is 500 Megahertz (MHz), the UCLK signal is 500 MHZ, and the MEMCLK signal is 1000 MHz.

Startup flow 400 reduces startup time and enhances user experience because the P1 state uses the same MEMCLK frequency as the P0 state. Instead of painstakingly training the parameters for operating each channel, rank, and device in the P1 state, the values previously obtained for the P0 state are copied into the region of shadow registers 176 that store the calibrated values of the P1 state. Moreover, since the power consumed by memory controller clock domain 230, DDR-physical interface clock domain 240, and memory clock domain 250 may be significantly smaller than that of the data processor cores, the UCLK and MEMCLK frequencies can be intentionally set to the same values as another memory P-state to improve startup time while only causing a relatively small increase in power consumption.

Figure 6:
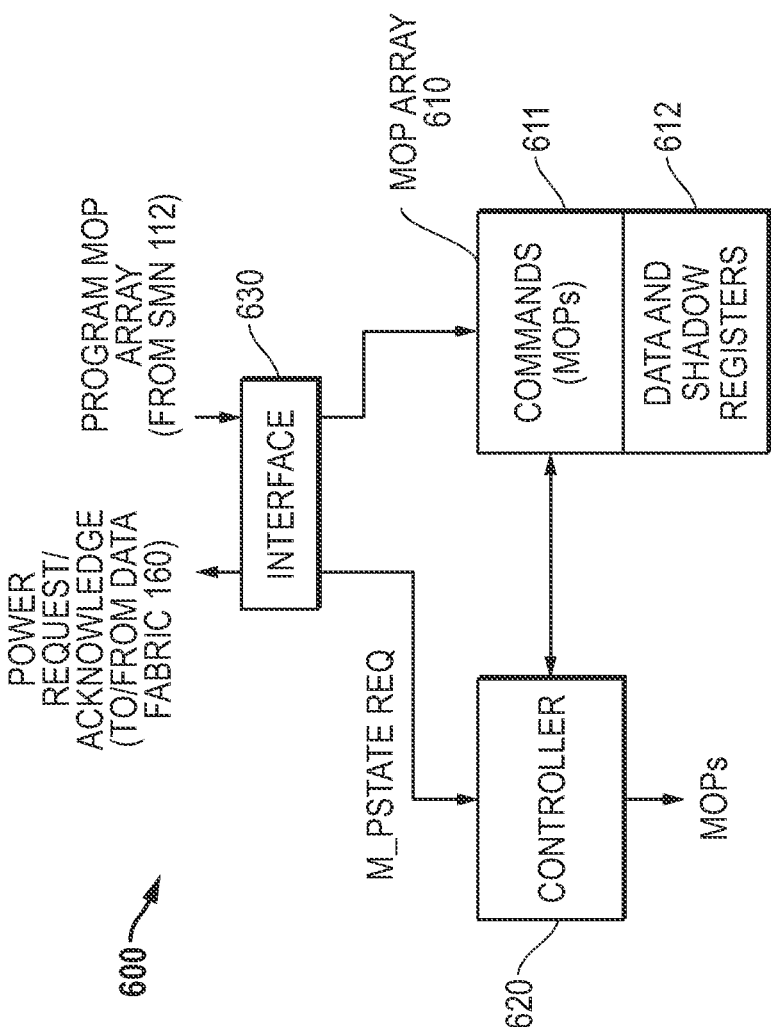
FIG. 6 illustrates in block diagram form a power controller suitable for use with the memory controller of FIG. 1 according to some implementations.

FIG. 6 illustrates in block diagram form a power controller 600 suitable for use with memory controller 173 of FIG. 1 according to some implementations. Power controller 600 includes generally a memory operation (MOP) array 610, a controller 620, and an interface circuit 630.

Interface circuit 630 connects power controller 600 to data fabric 160 to receive power state change commands from and to provide power state change acknowledgments to SMN 112, and receives data to be programmed into MOP array 610. Interface circuit 630 has a first port bidirectionally connected to data fabric 160 as described above, and as shown in pertinent detail here has an input for receiving a power state change request signal labeled "POWER REQUEST" from data fabric 160, and an output for providing a power state change acknowledge signal labeled "POWER ACKNOWLEDGE" to data fabric 160, and a second port for receiving data to program MOP array 610 labelled "PROGRAM MOP ARRAY" from SMU 111 over SMN 112. Interface circuit 630 also has a second port with a first output for providing a memory power state change request signal labeled "M_PSTATE REQ", and a second output for providing data for storage in MOP array 610.

Controller 620 has an input connected to the first output of the second port of interface circuit 630, a bidirectional port, and an output for providing decoded MOPs for memory controller 173 to provide to memory 180. Controller 620 reads and executes commands stored in MOP array 610 in a manner which will be described further below.

MOP array 610 has an input connected to the second output of the second port of interface circuit 630, and a bidirectional connection to controller 620. MOP array 610 is divided into a command portion 611 for storing MOPs, and a data portion 612 for storing data, in which data portion 612 includes shadow registers containing parameters and calibration data for different memory power states.

On startup, the BIOS stored in BIOS memory 157 of FIG. 1 queries memory 180 to determine the type of memory that has been installed and its organization. It typically does so by reading a small non-volatile memory chip on each DIMM present in the system. In the exemplary implementation, physical interface circuit 174 is capable of interfacing to DDR5 memory. In response to detecting the type and capabilities of memory installed in memory 180 and performing training using training controller 175, the system BIOS populates MOP array 610. MOP array 610 is programmed with a sequence of commands that initiate entry into and exit from each supported operating power state low power modes for the particular type of memory in command portion 611, and with various parameters set according the P-state and memory characteristics, as well as values obtained during training in data portion 612.

In the illustrated implementation of FIG. 1, memory controller 173 operates according to the model described by the Advanced Configuration and Power Interface (ACPI) Specification. It supports various power states (e.g., the P0, P1, and P2 states) in the working (or D0) state of the memory, as well as various low power states (e.g., the D1, D2, and D3 states). According to the ACPI Specification, the working state of a device (such as memory controller 173 or memory 180) is known as the D0 or "fully on" state. The other states are low power states and include the D1, D2, and D3 states, in which the D3 state is the "off" state. Memory controller 173 is capable of making frequency and/or voltage changes within the D0 state and corresponding changes to the memory chips to operate at the speed corresponding to the selected P-state in the D0 state. It also controls placing memory 180 into lower power states corresponding to the available D states of memory controller 173.

Upon receipt of a POWER REQUEST, interface circuit 630 provides the M_PSTATE REQ signal to controller 620 to indicate which power state is requested. In response, controller 620 accesses MOP array 610 to execute a sequence of MOPs that place the memory chips in the appropriate states for the requested D state, and in particular, the appropriate power-state (P-state) within the D0 state. Controller 620 outputs indexes into command portion 611 of MOP array 610, and MOP array 610 returns encoded commands (MOPs) in response. In one example, controller 620 decodes and issues MOPs linearly from entries in command portion 611 with data from data portion 612, with no branching, until the first null entry is read from command portion 611. Many of these commands are mode register set (MRS) commands that use data values stored in data portion 612. For example, these data values can be specific settings for the large set of DDR5 mode registers that need to be programmed for the particular selected power state.

It should be apparent that the micro-architecture of power controller 600 is just one possible micro-architecture, and other micro-architectures are possible.

Thus, data processing systems 100 and 200 and their associated memory controllers can provide significantly faster startup when the associated memory clock frequencies remain the same between memory P-states. It does so by bypassing the long training sequences and replacing them with copy operation between shadow registers kept in the memory controller to mirror mode register settings for memory P-states.

While particular implementations have been described, various modifications to these implementations will be apparent to those skilled in the art. For example, the techniques described above can be used advantageously with DDR5 DRAM or other existing or future memory types that require training of large numbers of parameters at startup. The startup training can also be followed by shorter "hot boot" training during operation to compensate for small drifts in parameter values due to, e.g., device heating. The results of the "hot-boot" training can then be stored into corresponding shadow registers. The techniques described above are applicable to systems that have only a single rank of memory or multiple ranks. The number of operating power states supported can vary between implementations. Also the training of the various power states and the programming or "expansion" of the shadow registers in the MOP array can proceed in any order, e.g., from the fastest P-state to the slowest, from the slowest to the fastest, or in an arbitrary order. The training controller was disclosed as a component of the physical interface circuit, but in other implementations, training could be accomplished in different ways, i.e., by using both the memory controller and the physical interface circuit.

Accordingly, it is intended by the appended claims to cover all modifications of the disclosed implementations that fall within the scope of the disclosed implementations.

What is claimed is:

1. A data processor, comprising:
a memory controller; and
a physical interface circuit coupled to the memory controller,
wherein in response to a system startup, the memory controller controls the physical interface circuit to selectively train a memory at each of a plurality of power states, wherein the memory controller trains the memory at a first power state of the plurality of power states if a memory clock frequency of the first power state of the plurality of power states does not equal the memory clock frequency of any previously trained power state of the plurality of power states, and bypasses training of the memory at the first power state of the plurality of power states if the memory clock frequency of the first power state of the plurality of power states equals the memory clock frequency of at least one previously trained power state of the plurality of power states.

2. The data processor of claim 1, wherein:
if the memory clock frequency of the first power state equals the memory clock frequency of at least one previously trained power state of the plurality of power states, the data processor copies training results of the other memory clock frequency into shadow registers; and
if the memory clock frequency of the first power state does not equal the memory clock frequency of any other previously trained power state, the memory controller causes the physical interface circuit to train the memory at the memory clock frequency of the first power state, and stores training results at the memory clock frequency of the first power state into the shadow registers.

3. The data processor of claim 1, wherein:
the memory comprises a plurality of memory channels.

4. The data processor of claim 1, wherein:
the memory comprises a plurality of ranks each comprising a plurality of memory chips.

5. The data processor of claim 1, further comprising:
a plurality of data processor cores; and
a data fabric for routing accesses between the plurality of data processor cores and the memory controller and operating at a data fabric clock frequency,
wherein the memory controller operates at a memory controller clock frequency,
wherein the physical interface circuit operates at the memory clock frequency, and
wherein each of the plurality of power states comprises a respective data fabric clock frequency, a respective memory controller clock frequency, and a respective memory clock frequency.

6. The data processor of claim 5, wherein the plurality of power states comprises:
a first power state having a first memory clock frequency;
a second power state having the first memory clock frequency; and a third power state having a second memory clock frequency different from the first memory clock frequency.

7. The data processor of claim 6, wherein:

the first power state further comprises a first data fabric clock frequency and a first memory controller clock frequency; and the second power state further comprises a second data fabric clock frequency and a second memory controller clock frequency, wherein either the second data fabric clock frequency is not equal to the first data fabric clock frequency, or the second memory controller clock frequency is not equal to the first memory controller clock frequency, or both.

8. A data processing system, comprising:

a data processor; and a memory having a plurality of mode registers for storing a configuration state, wherein in response to a system startup, the data processor selectively trains the memory at each of a plurality of power states, wherein the data processor trains the memory at a first power state of the plurality of power states if a memory clock frequency of the first power state of the plurality of power states does not equal the memory clock frequency of any previously trained power state of the plurality of power states, and bypasses training of the memory at the first power state of the plurality of power states if the memory clock frequency of the first power state of the plurality of power states equals the memory clock frequency of at least one previously trained power state of the plurality of power states.

9. The data processing system of claim 8, wherein:

the memory uses the plurality of mode registers to operate at a corresponding memory clock frequency.

10. The data processing system of claim 9, wherein:

the data processor copies training values to the mode registers of the memory in response to a power state change from a current power state to another power state having a different memory clock frequency.

11. The data processing system of claim 9, wherein:

the memory comprises a plurality of memory channels.

12. The data processing system of claim 9, wherein:

the memory comprises a plurality of ranks each comprising a plurality of memory chips.

13. The data processing system of claim 8, wherein:

if the memory clock frequency of the first power state equals the memory clock frequency of at least one previously trained power state of the plurality of power states, the data processor copies training results of the other memory clock frequency into shadow registers; and if the memory clock frequency of the first power state does not equal the memory clock frequency of any previously trained power state, the data processor causes a physical interface circuit to train the memory at the memory clock frequency of the first power state, and stores training results at the memory clock frequency of the first power state into the shadow registers.

14. The data processing system of claim 8, wherein the data processor comprises:

a plurality of data processor cores; and a data fabric for routing accesses between the plurality of data processor cores and a memory controller and operating at a data fabric clock frequency, wherein the memory controller operates at a memory controller clock frequency, wherein the data processor includes a physical interface circuit that operates at the memory clock frequency, and wherein the data processing system operates at a selected one of the plurality of power states, each power state comprising a respective data fabric clock frequency, a respective memory controller clock frequency, and a respective memory clock frequency.

15. The data processing system of claim 14, wherein the plurality of power states comprises:

a first power state having a first memory clock frequency;

a second power state having the first memory clock frequency; and a third power state having a second memory clock frequency different from the first memory clock frequency.

16. The data processing system of claim 15, wherein:

the first power state further comprises a first data fabric clock frequency and a first memory controller clock frequency; and the second power state further comprises a second data fabric clock frequency and a second memory controller clock frequency, wherein either the second data fabric clock frequency is not equal to the first data fabric clock frequency, or the second memory controller clock frequency is not equal to the first memory controller clock frequency, or both.

17. A method for use in a data processing system, comprising:

for each of a plurality of power states including a memory clock frequency:

if the memory clock frequency of a given power state is different from the memory clock frequency of each previously trained power state, training a memory at the memory clock frequency of the given power state and storing training values in shadow registers; and if the memory clock frequency of the given power state is the same as the memory clock frequency of any previously trained power state, bypassing the training and copying values of a previously trained power state having the same memory clock frequency in the shadow registers for the given power state.

18. The method of claim 17 wherein training the memory further comprises:

training the memory in response to a system startup.

19. The method of claim 17, further comprising:

subsequently operating the memory at a selected one of the plurality of power states.

20. The method of claim 17, wherein:

the plurality of power states is in a descending order of power consumption, wherein the descending order is monotonic with respect to the memory clock frequency.

* * * * *